G. C. STACY.
COTTON CLEANER.
APPLICATION FILED JAN. 5, 1920.
1,357,124.
Patented Oct. 26, 1920.
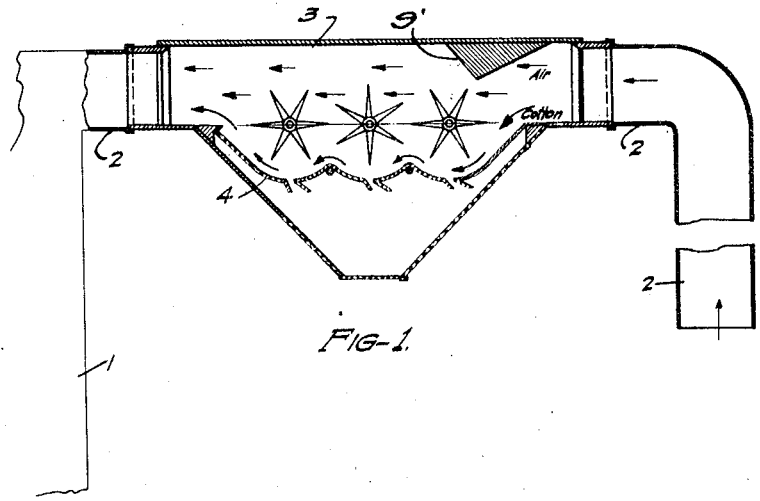
FIG-1.
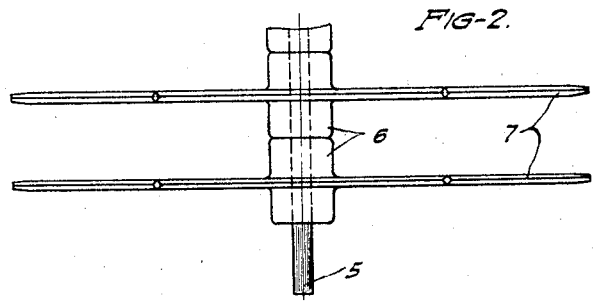
FIG-2.
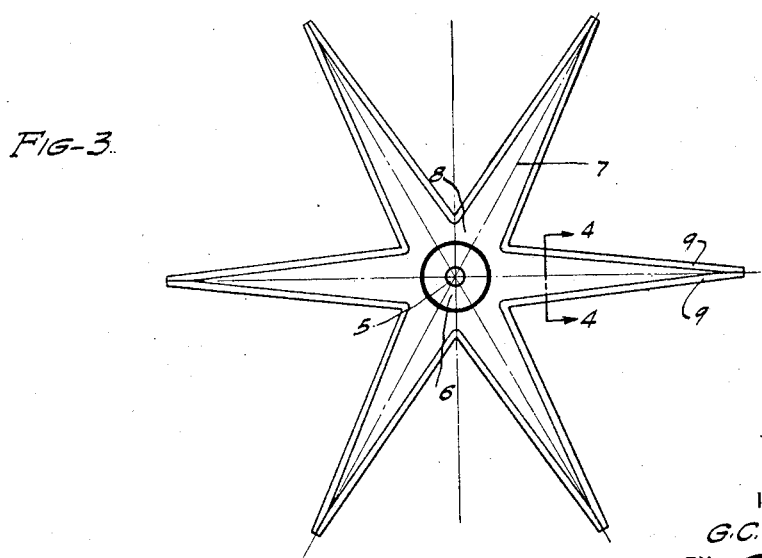
FIG-3.
FIG-4.
INVENTOR
G. C. STACY.
BY
ATTORNEY

UNITED STATES PATENT OFFICE.

GROVER C. STACY, OF DALLAS, TEXAS.

COTTON-CLEANER.

1,357,124.	Specification of Letters Patent.	Patented Oct. 26, 1920.

Application filed January 5, 1920. Serial No. 349,449.

*To all whom it may concern:*

Be it known that I, GROVER C. STACY, a citizen of the United States of America, residing at Dallas, in the county of Dallas and State of Texas, have invented certain new and useful Improvements in Cotton-Cleaners, of which the following is a specification.

This invention relates to new and useful improvements in beaters for cotton cleaners.

The invention has particularly to do with beaters in which the blades or arms pass over the concaved surfaces of screens underlying the said beaters. With the beaters now commonly in use considerable difficulty has been experienced with the cotton working toward the center of the beater unit and clogging around the hub; also there has been a great deal of trouble caused by the cotton wrapping around the beater arms, making it difficult for the cotton to discharge from the unit and considerably slowing up the operation of the cleaner.

The result sought by this invention is to provide a beater whereby the cotton instead of working toward the center of the unit will be caused to travel outwardly or radially thus being freely and quickly released from the arms of the unit and the tendency to clog, reduced to a minimum. Such an arrangement will tend to force the cotton down onto the concaved screens and carry the cotton thereover in a much more expeditious and efficacious manner.

In carrying out the invention a beater element is provided which includes a shaft and plurality of beater units assembled on the shaft in such order that the beater arms or blades radiate from the said shaft. The blades of each unit radiate from a hub and each blade tapers from the hub to its tip and the edges of the blades are beveled and reduced. It is quite obvious that the cotton will slide off of such a structure. Other novel features will be hereinafter more particularly brought out.

The invention will be more fully understood by referring to the following specification and observing the accompanying drawings, in which an example of the invention is shown and wherein:—

Figure 1 illustrates in side elevation a cleaner apparatus with the cleaner casing in section to show the beaters in end elevation.

Fig. 2 is a plan view enlarged of a beater shaft broken away.

Fig. 3 is a side elevation enlarged of one of the beater cleaners.

Fig. 4 is a sectional view taken on the line 4—4 of Fig. 3.

Similar reference numerals refer to similar parts throughout the drawings.

In the preferred embodiment of my invention illustrated in the drawings, I show my invention in conjunction with a gin 1 having a suction feed line 2 in which is interposed a cleaning apparatus comprising a casing 3 having a foraminous concave 4 formed with a series of curved pockets above each of which is adapted to rotate a beater element.

Each beater element comprises a shaft 5 having assembled and made fast thereon a series of beaters, each beater comprising a hub 6 laterally extended on each side to space the beaters the requisite distance apart on the shaft. Integral with the hub of each beater are six blades 7 which are joined at their bases to an annular flange 8 at the middle of the hub. As viewed in side elevation, each blade tapers symmetrically and sharply to its tip. In like manner, as viewed in front elevation, each blade has a slight taper toward its point. The front and rear edge of each blade is sharpened by the provision of converging flat faces 9 leading from the parallel side faces to each edge throughout the length of the blade, the sharpened edges thus left being just enough rounded to avoid tearing or breaking the fiber. The blades are wide enough at their bases to give them great strength to withstand being broken by nails, stones, or foreign matter in the cotton.

The beaters are set with the narrow edges of their blades in line with the air current through the cleaner and with their hubs below the air current so that they will not, to an appreciable extent, clog or obstruct the draft through the cleaner. A deflector 9 prevents the cotton passing through the cleaner above the path of the beaters. The beaters on successive shafts are relatively staggered and the several beater shafts are connected up in any suitable manner so as to all rotate in the same direction, which is clockwise in the illustration shown. They are rotated at such speed as to present successively the blades of the initial beaters with such rapidity as to cause them to pick up all the cotton entering with the air current and drive it downwardly so that it passes under successive beater shafts until at the end of the cleaner it is restored to the air current which, by reason of the design and position of the beaters, passes without loss of velocity through the substantially unobstructed top of the cleaner. This critical speed of operation is most easily and practically obtained where my type of beater is used, as here the beaters are juxtaposed to prevent cotton passing between them and there being a multiplicity of blades on each fast spinning beater, they present in effect a revolving screen which strips the air current of its cotton. Were single staggered beater blades used, the critical speed required would be impossible and where the blade pierces the shaft the requisite speed is impractical of attainment in the type of cleaners in question. The speed of rotation for the blades is determined by experiment, having regard to the velocity of flow of the cotton laden air current and the number of blades on each hub, the critical speed being reached when the blades on the initial shaft will be presented in succession with sufficient rapidity to catch and throw all of the entering cotton down against the screening concave, preventing any escaping overhead or getting to the hubs 6.

It is pointed out that the beveled edges of the blades, give to each blade at its tip or outer end, a substantially diamond shape or point. This is of particular advantage as the diamond points will catch the cotton and drag it over the concave screens 4; whereas a blunt end would tend to roll and wad the cotton. It is obvious that the width given the blades between their tapering edges is such, particularly adjacent the hub, as to preclude the possibility of the cotton wrapping around the said blades. The centrifugal action will tend to throw the cotton radially from the hubs, but this would be impeded if the cotton did not readily release from the arms. The tapering construction of the arms aids in the radial displacement of the cotton, as is apparent. Another feature of importance is the arrangement of all the arms of a beater in the same vertical plane and the provision of ample clearance between the beaters so that cotton cannot become clogged therebetween. By setting the beaters of the next succeeding set in staggered relation to the beaters of the preceding set, the arms of the former readily pick up the cotton discharged from the latter.

This invention is not intended to be restricted in scope to the specific embodiments shown, but contemplates such modifications as come within the spirit and scope of the claims.

Having thus described my invention, what I claim as new and desire to secure by Letters Patent, is:—

1. A beater for a cotton cleaner, comprising a rotatable member having a plurality of radial elements, each element being longitudinally tapered and increasing in width toward its inner end, the increased size of the radial element near the inner end preventing the cotton from wrapping about the same and the outward taper of the element aiding centrifugal force in moving the cotton outwardly and longitudinally upon the element to free the cotton from such element.

2. A beater for a cotton cleaner, comprising a rotatable member embodying radial elements, said radial elements being disposed in substantially the same plane, each radial element tapering longitudinally and increasing in width toward its inner end, the increased size of the radial element near its inner end preventing the cotton from wrapping about the same and the outward taper of the element aiding centrifugal force in moving the cotton outwardly and longitudinally upon the element to free the cotton from the element.

3. A beater for a cotton cleaner, comprising a rotatable member embodying radial elements, each element being relatively thin and longitudinally tapered and increasing in width toward its inner end whereby the cotton is prevented from wrapping about the enlarged inner portion of the element and the longitudinal taper of the element aiding centrifugal force in moving the cotton longitudinally and outwardly upon the element to free the cotton from the element.

4. A beater for a cotton cleaner comprising a rotatable member embodying radial elements, each element being relatively thin and having opposed substantially flat faces, each element being longitudinally tapered and increasing in width toward its inner end whereby the cotton is prevented from wrapping about the enlarged inner portion of the element and the outward taper of the element aiding centrifugal force in moving the cotton outwardly and longitudinally upon the element, each element being provided upon its opposite edges with outwardly converging faces.

5. A beater for a cotton cleaner comprising a rotable member embodying radial elements, each element being relatively thin and having opposed substantially flat faces, each element being longitudinally tapered and increasing in width toward the enlarged inner portion of the element and the outward taper of the element aiding centrifugal force in moving the cotton outwardly and longitudinally upon the element, each element being provided upon its opposite edges with pairs of outwardly converging faces, the outer portions of the converging faces in one pair meeting the outer portions of the faces of the other pair whereby the outer end of the element is diamond shaped in cross section, such diamond shaped end serving to effectively drag the cotton across a cleaning screen.

In testimony whereof I affix my signature.

GROVER C. STACY.

Witness:
NOMIE WELSH.